United States Patent
Masters et al.

(10) Patent No.: US 11,386,028 B2
(45) Date of Patent: Jul. 12, 2022

(54) METHOD TO TEST DIRECT MEMORY ACCESS (DMA) ADDRESS CAPABILITIES AT HIGH ADDRESS VALUES

(71) Applicant: Teledyne LeCroy OakGate, Inc., Thousand Oaks, CA (US)

(72) Inventors: Aaron Masters, Loomis, CA (US); Kevin Lemay, Loomis, CA (US); Chuck Tuffli, Sloughhouse, CA (US)

(73) Assignee: TELEDYNE LECROY, INC., Thousand Oaks, CA (US)

( * ) Notice: Subject to any disclaimer, the term of this patent is extended or adjusted under 35 U.S.C. 154(b) by 0 days.

(21) Appl. No.: 16/831,345

(22) Filed: Mar. 26, 2020

(65) Prior Publication Data

US 2020/0311002 A1 Oct. 1, 2020

Related U.S. Application Data

(63) Continuation of application No. 62/826,265, filed on Mar. 29, 2019.

(51) Int. Cl.
| | |
|---|---|
| *G06F 13/28* | (2006.01) |
| *G06F 12/10* | (2016.01) |
| *G06F 13/42* | (2006.01) |
| *G06F 11/30* | (2006.01) |
| *G06F 11/34* | (2006.01) |
| *G06F 11/22* | (2006.01) |

(52) U.S. Cl.
CPC .......... *G06F 13/28* (2013.01); *G06F 11/2221* (2013.01); *G06F 11/3037* (2013.01); *G06F 11/3485* (2013.01); *G06F 12/10* (2013.01); *G06F 13/4282* (2013.01); *G06F 2213/0026* (2013.01)

(58) Field of Classification Search
CPC .. G06F 13/28; G06F 11/2221; G06F 11/3037; G06F 11/3485; G06F 12/10; G06F 13/4282

See application file for complete search history.

(56) References Cited

U.S. PATENT DOCUMENTS

| | | | |
|---|---|---|---|
| 2005/0015378 A1* | 1/2005 | Gammel | G06F 12/1009 |
| 2005/0204114 A1* | 9/2005 | Yoder | G06F 12/0284 |
| | | | 711/203 |
| 2007/0168643 A1* | 7/2007 | Hummel | G06F 12/1009 |
| | | | 711/207 |
| 2008/0114906 A1* | 5/2008 | Hummel | G06F 12/1081 |
| | | | 710/22 |
| 2012/0023298 A1* | 1/2012 | Duzly | G06F 12/0638 |
| | | | 711/154 |
| 2012/0272037 A1* | 10/2012 | Bayer | G06F 13/4072 |
| | | | 711/202 |
| 2014/0237208 A1* | 8/2014 | Colbert | G06F 11/2205 |
| | | | 711/170 |

(Continued)

*Primary Examiner* — Phong H Dang
(74) *Attorney, Agent, or Firm* — K&L Gates LLP

(57) ABSTRACT

A method for detecting a Direct Memory Access (DMA) address capability at high address values when testing PCIe devices is disclosed. The method includes enabling an input/output (I/O) memory management unit (IOMMU); remapping physical addresses to virtual addresses at a high end of an address range; adding a peripheral component interconnect express (PCIe) device; and mapping physical memory addresses to high value memory addresses.

19 Claims, 3 Drawing Sheets

(56) References Cited

U.S. PATENT DOCUMENTS

| | | | |
|---|---|---|---|
| 2016/0062911 A1* | 3/2016 | Kegel | G06F 12/02 710/308 |
| 2018/0025150 A1* | 1/2018 | Shivanna | G06F 21/85 713/2 |
| 2020/0012501 A1* | 1/2020 | Suryanarayana | G06F 21/52 |

* cited by examiner

METHOD TO TEST DIRECT MEMORY ACCESS (DMA) ADDRESS CAPABILITIES AT HIGH ADDRESS VALUES

CLAIM OF BENEFIT TO PRIOR APPLICATION

This application claims benefit to U.S. Provisional Patent Application 62/826,265, entitled "Method to Test DMA Address Capability at High Address Values," filed Mar. 29, 2019, which is incorporated herein by reference in its entirety.

The U.S. patent application Ser. No. 16/728,338, entitled "Detection Of A DMA (Direct Memory Access) Memory Address Violation When Testing PCIe Devices" is incorporated herein by reference in its entirety.

BACKGROUND

In various aspects, the present disclosure relates generally to error detection during device development and testing, and more particularly, to a method for testing Direct Memory Access (DMA) address capabilities at high address values when testing peripheral component interconnect express (PCIe) devices.

A typical computer is configured with a specific amount of physical memory. The first address to a physical memory is typically a number very close to zero (0) and the number of individual addresses to access all memory addresses will be limited to the number of addressable memory addresses in the physical memory.

The amount of possible numerical memory addresses available to a DMA capable device always exceeds the actual number of physical memory addresses. In a normal test configuration successful DMA data transfers can be made only to memory addresses where there is a physical memory address to store and retrieve data. This represents a problem for testing DMA accesses to numerical memory address values that extend beyond the number of physical memory addresses.

What is needed is a method for testing and verifying memory addressing capabilities at the high end of the available numerical memory address range. What is needed is a method for testing and verifying high numerical value DMA address capabilities of address bits substantially beyond the memory address range of the physical memory.

SUMMARY

A novel method for testing and verifying a DMA address capability at high address values when testing PCIe devices is disclosed. In some aspects, the method for testing and verifying a DMA memory address capability at high address values when testing PCIe devices applies to unintentional and intentional accesses of such memory space.

In one aspect, the present disclosure provides a method for detecting a Direct Memory Access (DMA) address capability at high address values when testing PCIe devices. The method comprises enabling an input/output (I/O) memory management unit (IOMMU); remapping physical addresses to virtual addresses at a high end of an address range; adding a peripheral component interconnect express (PCIe) device; and mapping physical memory addresses to high value memory addresses.

The method for detecting a DMA address capability at high address values when testing PCIe devices may comprise monitoring direct memory access (DMA) for accesses to the high value memory addresses. In some aspects, monitoring is repeated until intentionally stopped.

The method for detecting a DMA address capability at high address values when testing PCIe devices may comprise adding a memory address for the PCIe device.

The IOMMU may comprise a virtual memory address space and a physical memory address space. The IOMMU may comprise an address mapping function. The address mapping function may map a virtual address of a target device in the virtual memory address space to a physical address in the physical memory address space.

The method for detecting a DMA at high address values when testing PCIe devices may comprise allocating contiguous memory addresses using the IOMMU. The method may comprise scanning mapped memory and avoiding address ranges used for the PCIe configuration address space.

In another aspect, the present disclosure provides a non-transitory computer readable medium storing a kernel configuration module which, when executed by a processor of a computing device, detects a Direct Memory Access (DMA) address capability at high address values when testing PCIe devices. The kernel configuration module comprises sets of instructions for: enabling an input/output (I/O) memory management unit (IOMMU) of the computing device; remapping physical addresses to virtual addresses at a high end of an address range; adding a peripheral component interconnect express (PCIe) device; and mapping physical memory addresses to high value memory addresses.

The non-transitory computer readable medium may comprise a set of instructions for monitoring DMA for accesses to the high address values. The non-transitory computer readable medium may comprise a set of instructions for monitoring DMA for accesses to the high address values comprises a set of instructions for repeatedly monitoring DMA at the high address values until intentionally stopped.

The non-transitory computer readable medium may comprise a set of instructions for adding a memory address for the PCIe device. The IOMMU may comprise a virtual memory address space and a physical memory address space, an address mapping function, and the virtual memory address space. The set of instructions for adding a memory address for the PCIe device may comprise a set of instructions for mapping the virtual address of the PCIe device in the virtual memory address space to a physical address in the physical memory address space. The set of instructions for mapping may comprise a set of instructions for using the address mapping function in the IOMMU.

The non-transitory computer readable medium may comprise a set of instructions for allocating contiguous memory addresses using the IOMMU. The non-transitory computer readable medium may comprise a set of instructions for scanning mapped memory and avoiding address ranges used for the PCIe configuration address space.

The preceding Summary is intended to serve as a brief introduction to some aspects of the present disclosure. It is not meant to be an introduction or overview of all inventive subject matter disclosed in this specification. The Detailed Description that follows and the Drawings that are referred to in the Detailed Description will further describe the aspects described in the Summary as well as other aspects. Accordingly, to understand all the embodiments described by this document, a full review of the Summary, Detailed Description, and Drawings is needed. Moreover, the claimed subject matter is not to be limited by the illustrative details in the Summary, Detailed Description, and Drawings, but rather are to be defined by the appended claims, because the claimed subject matter can be embodied in other specific forms without departing from the scope of the subject matter.

BRIEF DESCRIPTION OF THE DRAWINGS

The novel features of the described subject matter are set forth with particularity in the appended claims. The described subject matter, however, both as to organization and methods of operation, may be best understood by reference to the following description, taken in conjunction with the accompanying drawings in which:

DETAILED DESCRIPTION

Figure 1:
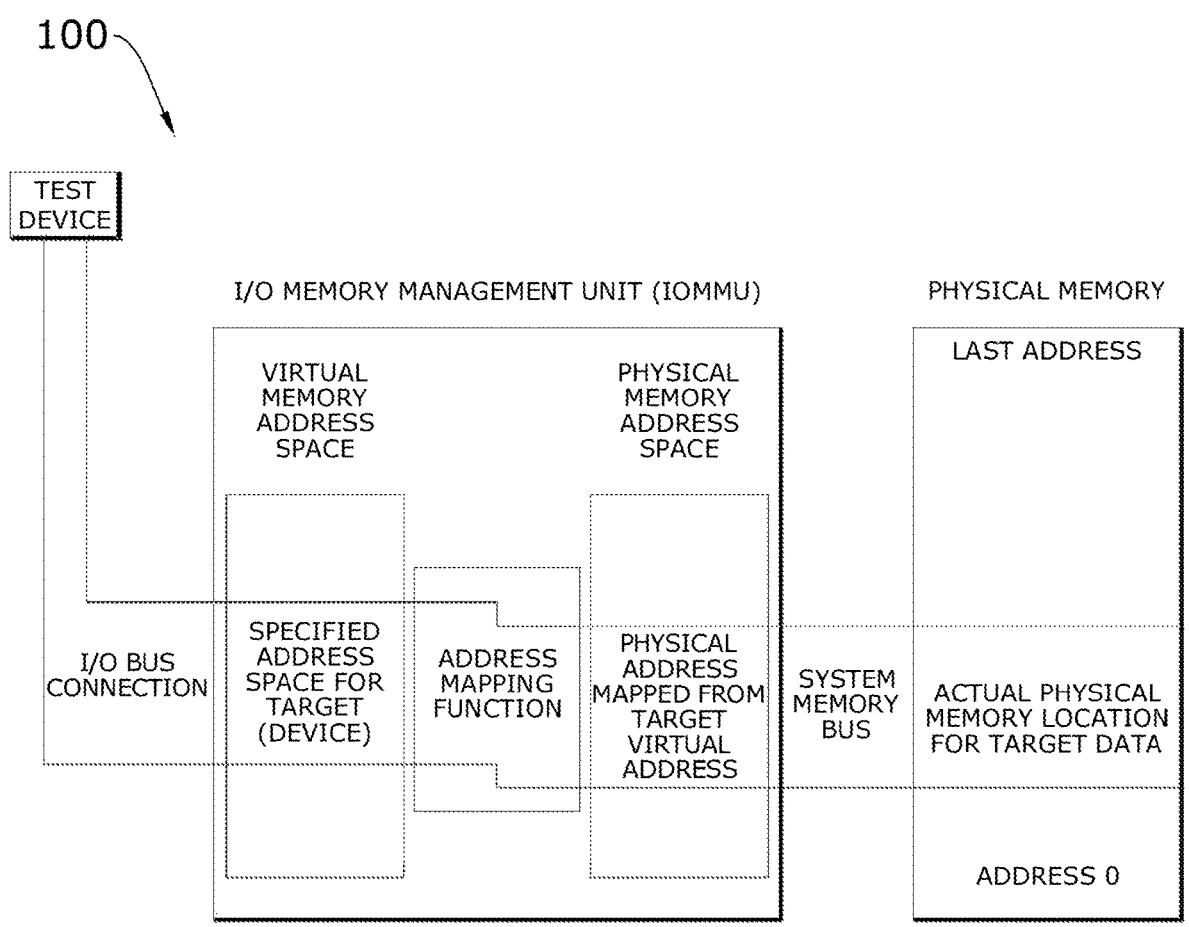
FIG. 1 conceptually illustrates a block diagram for detecting of a DMA address capability at high address values when testing peripheral component interconnect express (PCIe) devices in some aspects.

In the following detailed description, numerous details, examples, and aspects of the subject matter are described. However, it will be clear and apparent to one skilled in the art that the appended claims are not limited to the subject matter set forth and that the appended claims can be adapted for any of several applications.

As stated above, a typical computer is configured with a specific amount of physical memory. The first address to a physical memory address is typically a number very close to zero (0) and the number of individual addresses to access all memory addresses will be limited to the number of addressable memory locations in the physical memory.

The amount of possible numerical memory addresses available to a DMA capable device always exceeds the actual number of physical memory addresses. In a normal test configuration successful DMA data transfers can be made only to memory addresses where there is a physical location to store and retrieve data. This represents a problem for testing access to numerical memory address values that extend beyond the number of physical memory addresses. The following disclosure provides a solution to solve this problem.

In one aspect, the present disclosure provides a method for testing and verifying memory addressing at the high end of the available numerical address range. By enabling and re-configuring processor functions this method enables testing high numerical value DMA address bits substantially beyond the address range of physical memory.

In one aspect, the present disclosure provides a method for testing DMA address capability at high address values when testing PCIe devices. In some aspects, the method for testing and verifying a DMA memory address capability at high address values when testing PCIe devices applies to unintentional and intentional accesses of such memory space.

In one aspect, the method for testing DMA address capability at high address values when testing PCIe devices comprises: (I) enabling an input/output (I/O) memory management unit (IOMMU); (ii) remapping physical addresses to virtual addresses at the high end of the address range; (iii) adding a PCIe device; (iv) mapping physical memory addresses to the high value memory addresses; and (v) monitoring DMA for any accesses to memory addresses at the high end of the available numerical memory address range.

Typically physical memory in a computer system starts at address zero (0) and increases toward the upper memory limit supported by the central processing unit (CPU). By way of example, modern CPUs can support up to 64 bit addresses. Adding enough memory to map actual memory into all possible physical 64 bit address space is cost prohibitive and the system has no control over what address the operating system provides. In this context, the high address values range refers to the "possible" memory addresses above the actual physical addresses in use. This allows the test system to verify that the device under test (DUT) properly handles addresses in the full 64 bit address range. As processors expand to 128 bit addresses, the concept remains the same. Therefore, the high address values range refers to the unused address range that exists above the physical memory to the limit supported by the CPU. Those skilled in the art will readily understand that high memory addresses is a generic term used to describe memory in the upper limits of the CPU addressing range.

In one aspect, the method for testing DMA address capability at high address values when testing PCIe devices provides the ability to test and verify memory addressing at the high end of the available numerical address range. By enabling and re-configuring processor functions, the method for testing DMA address capability at high address values when testing PCIe devices enables testing high numerical value DMA address bits substantially beyond the address range of physical memory.

As stated above, there is a present need for a method for testing and verifying memory addressing at the high end of the available numerical address range. By enabling and re-configuring processor functions the method enables testing high numerical value DMA address bits far beyond the address range of physical memory. Aspects of the method for testing and verifying memory addressing at the high end of the available numerical address range when testing PCIe devices of the present disclosures address these issues and solve these problems by enabling the IOMMU to re-map physical memory addresses to virtual addresses at the high end of the address range. Typically, the IOMMU is disabled unless a virtual machine software is installed and running. Once the virtual address at the high end of the address range is established for a given device, a DMA at the high end of the available numerical address range can be tested and verified.

In one aspect, the method for testing and verifying memory addressing at the high end of the available numerical address range when testing PCIe devices differs from and improves upon currently existing methods. In particular, currently in a test system used to test DMA devices, the available address range is limited to a numerical range associated with the size of the physical memory. This limitation does not allow the tester to validate memory access beyond that limited range. The method for testing and verifying memory addressing at the high end of the available numerical address range when testing PCIe devices creates an address mapping capability where physical memory addresses are mapped to numerically high virtual address values. This mapping enables the tester to validate memory access to the high numerical address values.

In one aspect, the method for testing and verifying memory addressing at the high end of the available numerical address range when testing PCIe devices of the present disclosure may be comprised of the following elements. This list of possible constituent elements is intended to be exemplary only and it is not intended that this list be used to limit the method for detecting a DMA address capability at the high end of the available numerical address range when testing PCIe devices of the present application to just these elements. Persons having ordinary skill in the art relevant to the present disclosure may understand there to be equivalent elements that may be substituted within the present disclosure without changing the essential function or operation of the method for detecting a DMA address at the high address values when testing PCIe devices.

1. Enable the IOMMU.
2. Remap physical addresses to virtual addresses at the high end of the address range.
3. Add a PCIe device.
4. Map physical memory addresses to high value memory addresses.
5. Monitor DMA for any accesses to memory addresses at the high end of the available numerical memory address range.

In one aspect, the present disclosure provides a new test application of the IOMMU. This test application enables a DMA capable device to address memory addresses that far exceed the addresses limitations associated with physical memory. This feature, will allow testing of device DMA access to the any high numerical addresses.

The method for testing and verifying memory addressing at the high end of the available numerical address range when testing PCIe devices of the present disclosure generally works by implementation of the method for testing and verifying memory addressing at the high end of the available numerical address range when testing PCIe devices, which includes enabling the IOMMU, and then using the IOMMU to re-map physical memory addresses to virtual addresses. By way of example, FIG. 1 conceptually illustrates a block diagram 100 in which IOMMU is enabled and used to re-map physical memory addresses to virtual addresses at the high end of the address range. Specifically, FIG. 1 highlights the IOMMU mapping a high numerical virtual address value to the lower numerical physical address value over a PCIe bus and a system memory bus. A target device access of a memory address that is at the high end of the available numerical address range can be tested and verified. If there is an error accessing the high end of the available numerical address range, an error will be generated and a test engineer will receive a notification from an application that implements the method for testing DMA address capabilities at high address values when testing PCIe devices (e.g., an application with a graphical user interface (GUI)). Any errors that occur when accessing, testing, or verifying the high address values will be logged in a test log.

Typically, the IOMMU is disabled unless a virtual machine software program is installed and running. Once the virtual address is established for a given device, any DMA (memory access) at the high end of the available numerical address range can be tested and verified. Errors that occur during the testing and verification process can be flagged and correlated to the device and the user can be notified of the errors. While this idea is used in virtual machine applications and systems, the improvements to these features as intended for testing and verifying DMA address capability at the high end of the available numerical address range therefore provides a new way to test and verify memory on storage devices either under test or in a production system that use the PCIe interface.

Figure 2:
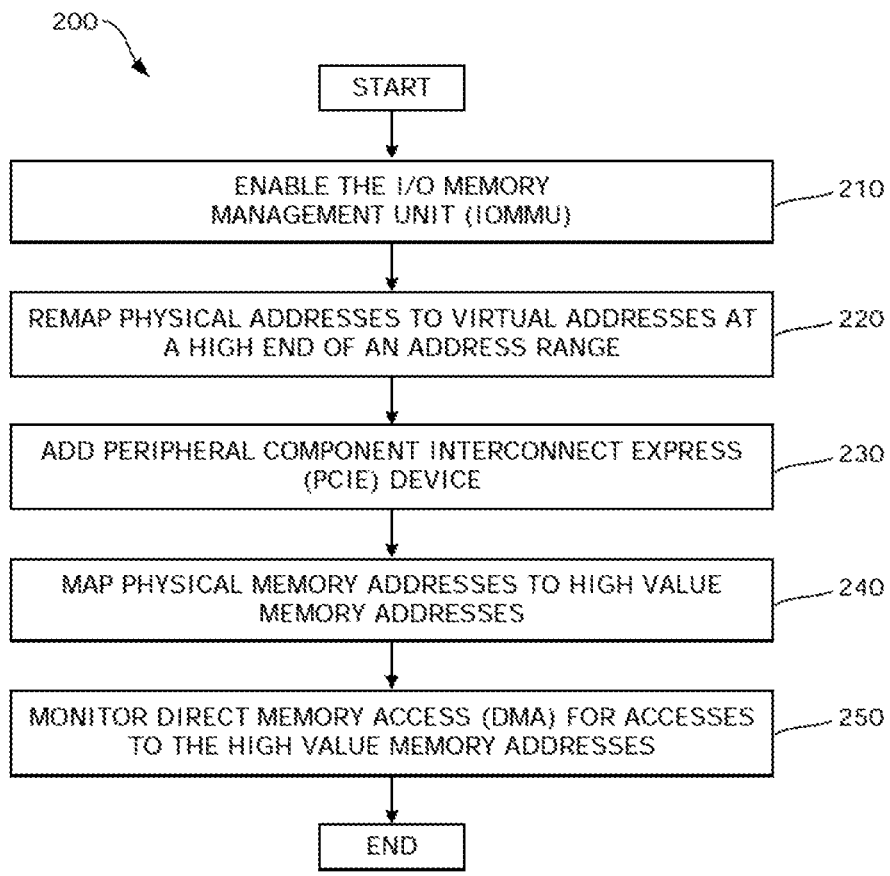
FIG. 2 conceptually illustrates a method for testing a Direct Memory Access (DMA) address capability at high address values when testing PCIe devices in some aspects.

By way of example, FIG. 2 conceptually illustrates a method 200 for testing and verifying memory addressing at the high end of the available numerical address range when testing PCIe devices. As shown in this figure, the method 200 for detecting a DMA address capability at the high address values when testing PCIe devices starts by enabling 210 the IOMMU. Next, the method 200 for detecting a DMA address capability at the high address values when testing PCIe devices remaps 220 the physical addresses to virtual addresses at the high end of the address range. After enabling 210 the IOMMU and remapping 220 the physical addresses to virtual addresses at the high end of the address range, the method 200 for detecting a DMA address capability at the high address values when testing PCIe devices of some aspects adds 230 a PCIe device. The method 200 for detecting a DMA address capability at the high address values when testing PCIe devices then map 240 physical memory addresses to high value memory addresses. Finally, the method 200 for detecting a DMA address capability at the high address values when testing PCIe devices monitors 250 DMA accesses to high value memory addresses. In some aspects, the method 200 for detecting a DMA address capability at the high address values when testing PCIe devices performs the monitoring 250 repeatedly until intentionally ended.

Essentially, the method 200 for testing and verifying DMA addressing capabilities at the high end of the available numerical address range when testing PCIe devices shown in FIG. 2 just remaps 220 the physical addresses to virtual addresses at the high end of the address range and the PCIe device and the memory addresses for the devices are then added. The method 200 for testing and verifying DMA addressing capabilities at the high end of the available numerical address range when testing PCIe devices also monitors the memory accesses of the device and when a violation is detected in a DMA access to an address in the high value memory address, an error is generated and a test engineer will receive the error notification from the graphical user interface (GUI) of the kernel configuration module or program and the error will be logged in a test log.

To make the method 200 for testing and verifying DMA addressing capabilities at the high end of the available numerical address range when testing PCIe devices of the present disclosure, one may implement the method 200 for testing and verifying memory addressing at the high end of the available numerical address range when testing PCIe devices by a program module. Specifically, the method 200 for testing and verifying memory addressing at the high end of the available numerical address range when testing PCIe devices can be implemented as a set of system commands in a kernel configuration module (such as a proprietary kernel configuration module known by the name "OakGate Kernel Configuration Module") which includes sets of computer instructions, electronic system instructions, and/or machine-readable instructions for enabling the IOMMU and configuring the IOMMU to create virtual addresses for specific devices on the PCIe backplane. Virtual addresses spaces are then set to the high end of the numerical address space. As indicated above, once the virtual memory space is defined and enabled, physical memory can be mapped to any memory address in the numerical address space.

As indicated above, once the virtual memory space is defined and enabled, the method 200 monitors 250 for any memory accesses a device makes in the high value memory addresses space triggers an error message that will be displayed to the user and/or the test will fail. In some embodiments, the method for testing and verifying memory addressing at the high end of the available numerical address range when testing PCIe devices, when implemented as the kernel configuration module, detects and categorizes these errors, and then presents them to the user indicating the device and its operation that caused the error and any high value memory addresses accessed in the specified memory space.

To use the method 200 for testing and verifying DMA addressing capabilities at the high end of the available numerical address range when testing PCIe devices of the present disclosure, one may start with a kernel configuration module (implementation of the method 200 for testing and verifying DMA addressing capabilities at the high end of the available numerical address range when testing PCIe devices) that is deployed in a test system or test environment, such as an OakGate test system. Although usage of the kernel configuration module (implementation of the method 200 for detecting a DMA address capabilities at the high end of the available numerical address range when testing PCIe devices) is possible with an OakGate test system, the method 200 for testing and verifying DMA addressing capabilities at the high end of the available numerical address range when testing PCIe devices and usage of a kernel configuration module is not limited to only an OakGate test system. A person of relevant skill in the art would appreciate that there are alternatives to using an OakGate test system. However, the implementation of the method 200 for testing and verifying DMA addressing capabilities at the high end of the available numerical address range when testing PCIe devices within the OakGate test system allows for a simple "enable high value memory access option" selection. Once the option to enable high value memory address access is selected, all memory accesses by the device under test are checked against what has been specified for that device. If a DMA memory address violation is detected when the PCIe device under test accesses a high value memory address, an error is flagged and logged.

In another aspect, the present disclosure provides a method for allocating large contiguous memory addresses using the IOMMU. The method for allocating large contiguous memory addresses employing the same techniques described herein for toggling the high order address bits for testing a device. The method for allocating large contiguous memory addresses can be used for testing large contiguous memory address allocations of a size that is not reasonable to provide with a modern operating system. The IOMMU hardware is utilized to map non-contiguous memory pages from the operating system into an address range provided to the DUT that appears to it to be contiguous.

The method for allocating large contiguous memory addresses using the IOMMU may be implemented by scanning the system memory map and avoiding any address range that is used for the PCIe configuration address space. In one non-limiting example, the memory may be divided into three sections. A low address memory may be used when a request resides below a 4 GB boundary (32 address bits), or other suitable boundary, for example. A shared memory area may be a fixed size memory (above 4 GB, or other suitable boundary) for mapping buffers that may be shared across devices, for example. In one aspect, this feature may allow the system to use the same address range for a buffer without conflicting with any other address range. This feature may be used for write pattern buffers as well as other shared structures. An upper memory may be the largest address range and may span from the shared memory area up to the upper PCIe configuration space, for example.

Each DUT maintains its own address mapping. This is represented in the driver as an array of bits that represent whether the address page is in use. Whenever a new allocation is received, the system memory map is scanned looking for adequate space for the allocation starting at the lowest address of the appropriate memory area. When memory is deallocated, the system maintains a separate dirty mapping. When a request is deallocated, the system marks the pages in the dirty mapping. When the system fails to find a range for an allocation, the system flushes the dirty mapping back into the allocation pool.

In one aspect, when memory is unmapped from the IOMMU, the update does not occur immediately and errors may occur if a different physical address is immediately mapped into the same device virtual address. This is the reason for allocating at the lowest allocation and working up with the dirty address list. By re-using the dirty address only after the address range is exhausted, provides time for the prior entries to be flushed from the system.

Although not limited to the OakGate test systems, the implementation of the method 200 for testing and verifying memory addressing at the high end of the available numerical address range when testing PCIe devices within the OakGate test system allows for a high order address range selection. Once this option is selected, all memory access by the DUT will attempt DMA transactions using addresses in this numerically high address values range. Testing for all types of DMA are contemplated and a correctly functioning target device will complete the I/O tests without issue. If I/O tests do not complete correctly, the DUT will have failed the test.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "program", "application", "module", and "kernel configuration module" are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 3:
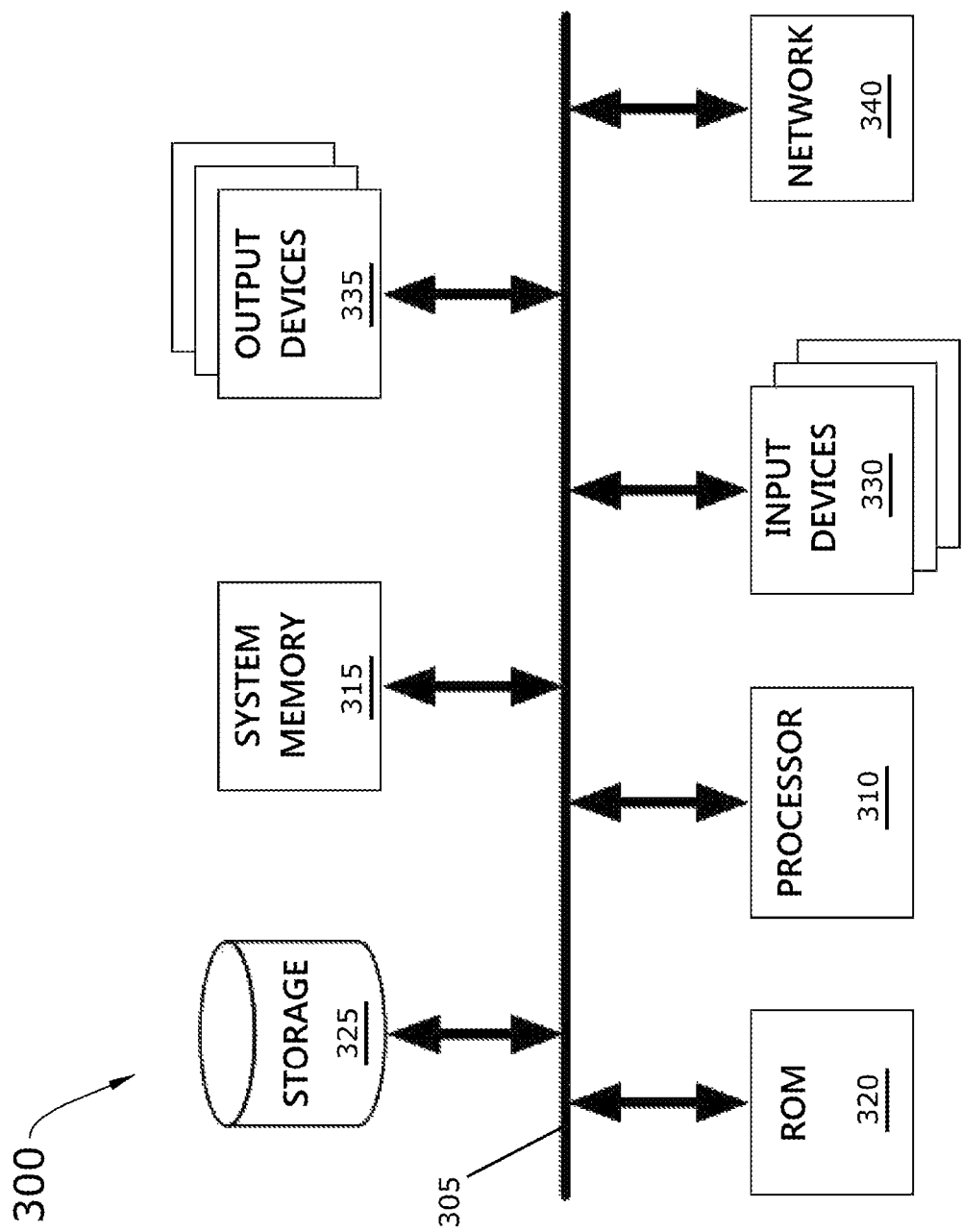
FIG. 3 conceptually illustrates an electronic system with which some aspects of the method for testing and verifying memory addressing at the high end of the available numerical address range when testing PCIe devices are implemented.

FIG. 3 conceptually illustrates an electronic system 300 with which some aspects of the method 200 (FIG. 2) for testing and verifying DMA addressing capabilities at the high end of the available numerical address range when testing PCIe devices are implemented. The electronic system 300 may be a computer, phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 300 includes a bus 305, processing unit(s) 310, a system memory 315, a read-only 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only 320, the system memory 315, and the permanent storage device 325.

From these various memory units, the processing unit(s) 310 retrieves instructions to execute and data to process in order to execute the processes of the invention. The processing unit(s) may be a single processor or a multi-core processor in different embodiments.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. In some aspects, a mass-storage device (such as a magnetic or optical disk and its corresponding disk drive) may be used as the permanent storage device 325.

In other aspects, a removable storage device (such as a floppy disk or a flash drive) may be used as the permanent storage device 325. Like the permanent storage device 325, the system memory 315 is a read-and-write memory device. However, unlike storage device 325, the system memory 315 is a volatile read-and-write memory, such as a random access memory. The system memory 315 stores some of the instructions and data that the processor needs at runtime. In some aspects, the processes described herein are stored in the system memory 315, the permanent storage device 325, and/or the read-only 320. For example, the various memory units include instructions for processing appearance alterations of displayable characters in accordance with some embodiments. From these various memory units, the processing unit(s) 310 retrieves instructions to execute and data to process in order to execute the processes of some aspects.

The bus 305 also connects to the input and output devices 330 and 335. The input devices enable the user to communicate information and select commands to the electronic system. The input devices 330 include alphanumeric keyboards and pointing devices (also called "cursor control devices"). The output devices 335 display images generated by the electronic system 300. The output devices 335 include printers and display devices, such as cathode ray tubes (CRT) or liquid crystal displays (LCD). Some embodiments include devices such as a touchscreen that functions as both input and output devices.

Finally, as shown in FIG. 3, bus 305 also couples electronic system 300 to a network 340 through a network adapter (not shown). In this manner, the computer can be a part of a network of computers (such as a local area network ("LAN"), a wide area network ("WAN"), or an intranet), or a network of networks (such as the Internet). Any or all components of electronic system 300 may be used in conjunction with the invention.

In various aspects, the method 200 (FIG. 2) for testing and verifying DMA addressing capabilities at the high end of the available numerical address range when testing PCIe devices may be implemented by a set of system commands in the electronic system shown in FIG. 3, which may include enabling the IOMMU and configuring the IOMMU to create virtual addresses for specific devices on the PCIe backplane. Virtual addresses spaces are then set to the high end of the numerical address space. As indicated above, once the virtual memory space is defined and enabled, physical memory can be mapped to any memory address in the numerical address space.

Although not limited to the electronic system shown in FIG. 3, the implementation within the electronic system shown in FIG. 3 allows for a high order address range selection. Once this option is selected, all memory access by the DUT will attempt DMA transactions using addresses in this numerically high address values range. Testing for all types of DMA are available. The expectation is that a correctly functioning target device will complete these I/O tests without issue. If the I/O tests do not complete correctly, the DUT will have failed the test.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some aspects include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While various aspects of the present disclosure have been described with reference to numerous specific details, one of ordinary skill in the art will recognize that various aspects the present disclosure can be embodied in other specific forms without departing from the spirit of the invention. For instance, FIG. 2 conceptually illustrates a process in which the specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for detecting a Direct Memory Access (DMA) address capability at high address values when testing PCIe devices, the method comprising:
    enabling an input/output (I/O) memory management unit (IOMMU);
    adding a peripheral component interconnect express (PCIe) device;
    creating by the IOMMU a specified virtual memory address space to the device;
    setting the specified virtual address space to high end of address space beyond a memory address range of physical memory;
    mapping physical memory addresses to high value memory addresses, wherein a high value memory address is defined as a memory address in an upper limit of an addressing range of a central processing unit (CPU); and
    checking direct memory access by the device against the specified virtual memory address space.

2. The method of claim 1, further comprising monitoring direct memory access (DMA) for accesses to the high value memory addresses.

3. The method of claim 2, wherein monitoring is repeated until intentionally stopped.

4. The method of claim 1, comprising adding a memory address for the PCIe device.

5. The method of claim 1, wherein the IOMMU comprises a virtual memory address space and a physical memory address space.

6. The method of claim 5, wherein the IOMMU comprises an address mapping function.

7. The method of claim 6, wherein the address mapping function maps a virtual address of a target device in the virtual memory address space to a physical address in the physical memory address space.

8. The method of claim 1, comprising allocating contiguous memory addresses using the IOMMU.

9. The method of claim 8, comprising scanning mapped memory and avoiding address ranges used for a PCIe configuration address space.

10. A non-transitory computer readable medium storing a kernel configuration module which, when executed by a processor of a computing device, detects a Direct Memory Access (DMA) address capability at high address values when testing PCIe devices, said a kernel configuration module comprising sets of instructions for:
    enabling an input/output (I/O) memory management unit (IOMMU);
    adding a peripheral component interconnect express (PCIe) device;
    creating by the IOMMU a specified virtual memory address space to the device;
    setting the specified virtual address space to high end of address space beyond a memory address range of physical memory;
    mapping physical memory addresses to high value memory addresses, wherein a high value memory address is defined as a memory address in an upper limit of an addressing range of a central processing unit (CPU); and
    checking direct memory access by the device against the specified virtual memory address space.

11. The non-transitory computer readable medium of claim 10, comprising a set of instructions for monitoring direct memory access (DMA) for accesses to the high value memory addresses.

12. The non-transitory computer readable medium of claim 11, wherein the set of instructions for monitoring direct memory access (DMA) for accesses to the high value memory addresses comprises a set of instructions for repeatedly monitoring direct memory access (DMA) for accesses to the high value memory addresses until intentionally stopped.

13. The non-transitory computer readable medium of claim 10, comprising a set of instructions for adding a memory address for the PCIe device.

14. The non-transitory computer readable medium of claim 13, wherein the IOMMU comprises a virtual memory address space, a physical memory address space, and an address mapping function.

15. The non-transitory computer readable medium of claim 14, wherein the set of instructions for adding a memory address for the PCIe device comprises a set of instructions for mapping the virtual address of the PCIe device in the virtual memory address space to a physical address in the physical memory address space.

16. The non-transitory computer readable medium of claim 15, wherein the set of instructions for mapping comprises a set of instructions for using the address mapping function in the IOMMU.

17. The non-transitory computer readable medium of claim 10, comprising a set of instructions for allocating contiguous memory addresses using the IOMMU.

18. The non-transitory computer readable medium of claim 17, comprising a set of instructions for scanning mapped memory and avoiding address ranges used for a PCIe configuration address space.

19. A method for detecting a Direct Memory Access (DMA) address capability at high address values when testing PCIe devices, the method comprising:
    enabling an input/output (I/O) memory management unit (IOMMU);
    adding a peripheral component interconnect express (PCIe) device;
    assigning by the IOMMU a virtual memory address space to the device;
    creating by the IOMMU a specified virtual memory address space to the device;
    setting the specified virtual address space to high end of address space beyond a memory address range of physical memory;
    mapping physical memory addresses to high value memory addresses, wherein a high value memory address is defined as a memory address in an upper limit of an addressing range of a central processing unit (CPU); and
    verifying direct memory access addressing capability of the device at the high end of the address range.

* * * * *